8418X

S. Leonard,

Horse Power.

Patented Sep. 23, 1834.

AM. PHOTO-LITHO. CO. N.Y. (OSBORNE'S PROCESS)

8418X Sept 23 1834 [illegible]

Silvanus Leonard of Hampden, Maine

Letters - Patent

Figure 2:
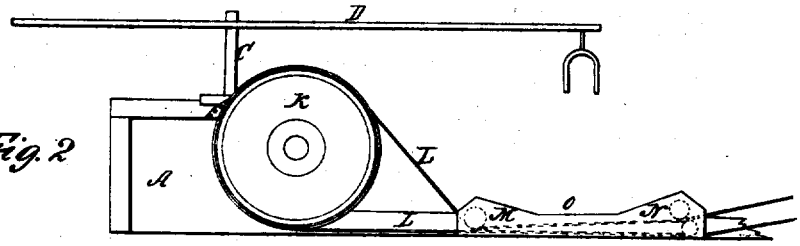
Figure 1:
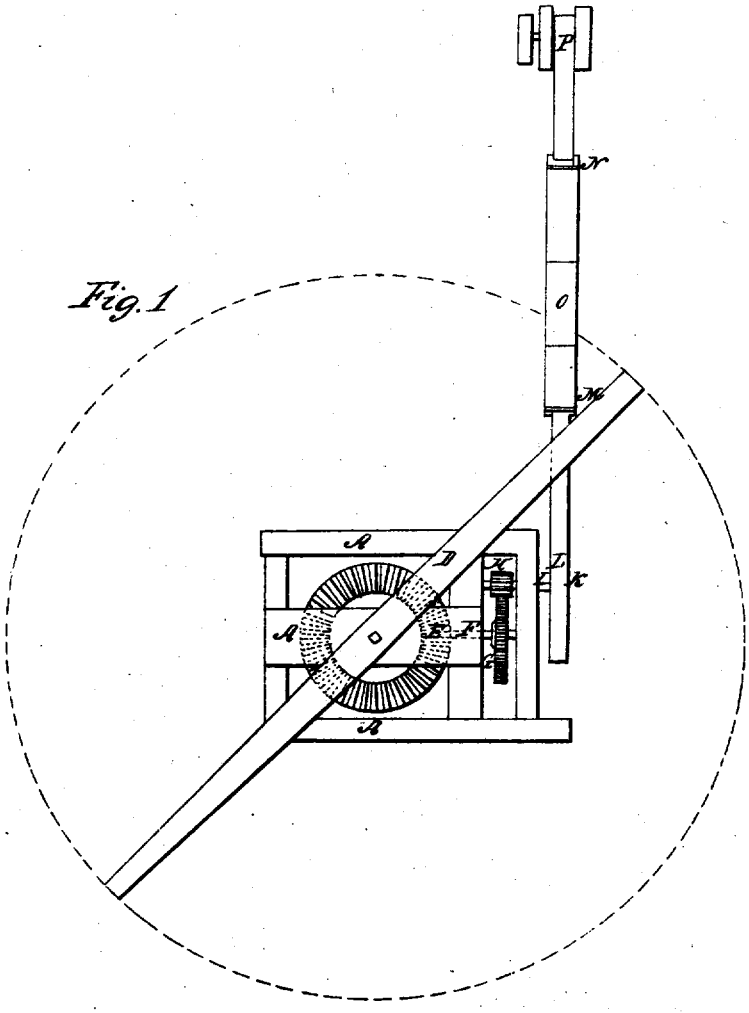

The Schedule referred to in these Letters Patent and making part of
the same containing a description in the words of the said
Silvanus Leonard himself, of his improvement in machinery
usually denominated a Horse Power To all persons to whom these presents shall come, Silva-
nus Leonard of Hampden, in the County of Penobscot, and State
of Maine, House Carpenter, sends Greeting. Be it known that
I, the said Silvanus Leonard, have invented, made and applied
to use, a new and useful invention in machinery usually de-
nominated a "Horse Power". the disposition arrangement and
uses of the several parts. I have fully described and set forth
in the following words, and annexed drawings. which taken
in connection, form my specification A.A. Figs 1 & 2 represent the frame work of timber or iron or
other suitable material, shaped as seen in the drawings, & in
other respects, suitably constructed to answer the intended
purpose of supporting the machinery. B. is a horizontal bev-
elled wheel on the upright main shaft C. the lower end or
foot of the main shaft C, turns, and is supported in a
bearing or step in the usual manner, while to the top or upper
end, is connected a long lever D. having at its opposite ex-
tremity a bow or other suitable fixtures for attaching a horse
to the same, the horse being the driving power. The bevelled
Wheel B acts on a bevelled pinion E. on a horizontal shaft
F. having on its other end a cogged Wheel G. whose teeth en
ter into the teeth of a small cogged pinion H. on a horizon-
tal shaft I. and by their action on the same turn around
the shaft I. This shaft I. has fixed on its other extremity, or
in any other convenient place, a large pulley or drum K.
around which an endless belt L passes. From the pulley K. the belt L. continues under the guide pulleys M.N. placed on each side of the horse track. O. and so situated that the belt shall pass under the horse track, as seen in the drawings Figs 1&2. From under these last pulleys, the belt is carried over and around the pulley or drum P. affixed to the machine it is proposed to drive or act on. I have applied this machinery to be moved by a horse, to a Thrashing Machine, but I do not mean to confine it exclusively to that purpose. but to operate and drive any machinery to which it may be conveniently attached and used to advantage.

I claim in the above the peculiar arrangement or combination of the several parts for the purposes above mentioned; and separately and singly, as a part of this combination, I claim guiding the belt in its passage from the pulley K to the pulley P. in a direction under the horse path or platform by small pulleys M & N. as seen and represented in the drawings. In testimony that the above is a true specification of my said invention I have hereunto set my hand this twenty fifth day of August in the year of our Lord Eighteen Hundred and thirty four

Witnesses
Caleb Eddy
Robt H. Eddy

Francis Leonard

2 Drawings